United States Patent Office 3,344,187
Patented Sept. 26, 1967

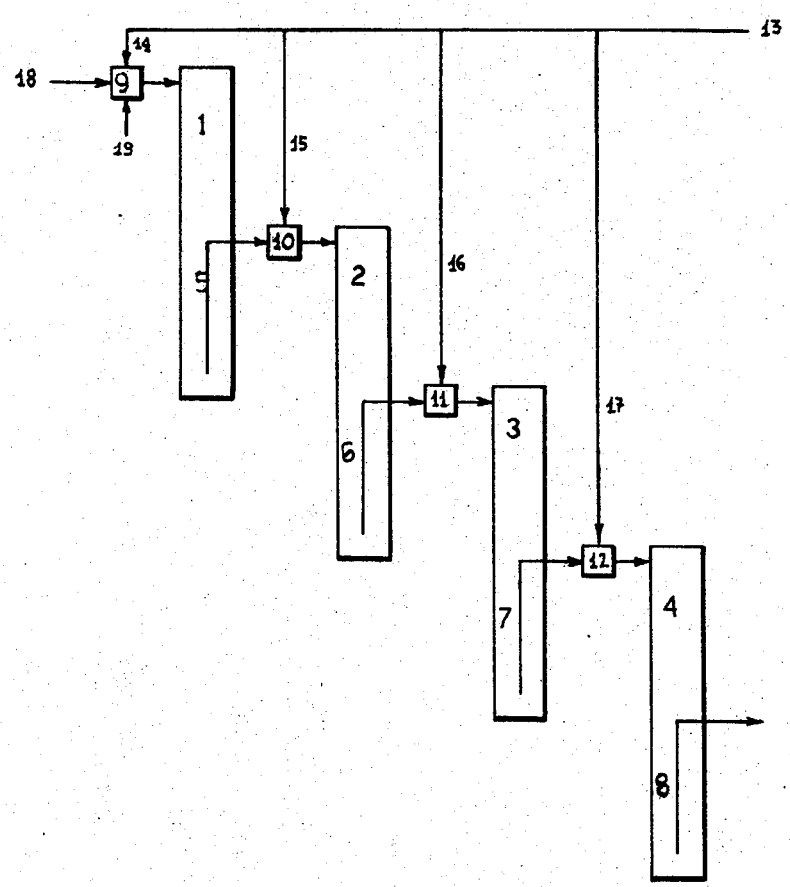

3,344,187
PROCESS FOR PREPARING CYCLO-ALKANONOXIMES
Giuseppe Caprara, Marcello Ghirga, and Guidobaldo Cevidalli, Milan, Italy, assignors to Montecatini Edison S.p.A., Milan, Italy, a corporation of Italy
Filed June 22, 1964, Ser. No. 376,884
Claims priority, application Italy, July 8, 1963, 14,086/63
8 Claims. (Cl. 260—566)

ABSTRACT OF THE DISCLOSURE

Process for the production of cycloalkanonoximes having rings with 5 to 12 carbon atoms wherein a cycloalkane of corresponding ring structure containing from 5 to 12 carbon atoms is reacted in gaseous phase and in the absence of ultraviolet activation, with a nitrogen oxide (e.g., nitric oxide) at a temperature between 150° and 650° C. in the presence of a reaction promoter activated at these temperatures and constituted by chlorine, bromine, nitrosyl chloride or nitrosyl bromide, the reaction occupying a period of substantially 0.1 to 10 seconds and the reaction promoter, nitrogen oxide and cycloalkane being present in a molar ratio ranging from 1:2:2 and 1:40:20.

Our present invention relates to a process for the production of cycloalkanonoximes and, more particularly, to a process of this type whereby cycloalkanes are reacted with nitrogen oxides in the presence of a reaction promoter.

It is known to produce cycloalkanonoximes or compounds readily convertible to these oximes—e.g. nitroso-cycloalkanes and bis-(nitroso-cycloalkanes)—by reacting a cyclic aliphatic compound, especially cyclohexane, with nitrogen oxides under ultraviolet radiation. The resulting reactions are presumably of the free-radical type, with the activated species being produced by the ultraviolet radiation.

Such processes, however, have a significant disadvantage in that ultraviolet irradiation requires the use of mercury-arc lamps which are expensive and wear out rapidly. Moreover, the use of such lamps involves a high consumption of electric power. In general, therefore, these processes for producing cycloalkanonoximes were industrially inhibited by the relatively costly equipment required and the complexity of such apparatus, especially if mass production of the product was desired.

It is, therefore, the principal object of the present invention to provide a process for the production of cycloalkanonoximes wherein these disadvantages are obviated and the reaction can be carried out at relatively low cost.

A further object of this invention is to provide a method of the character described wherein the activation energy can be derived from a source other than mercury-vapor lamps and can be other than ultraviolet radiation.

Still another object of our invention is to provide a process for the production of cycloalkanonoximes in large quantities without the need for complex equipment.

The present invention is based upon our surprising discovery that, in spite of the fact that cycloalkanonoximes have been produced heretofore almost exclusively with the aid of ultraviolet-activatable reaction promoters, it is also possible to convert certain cycloalkanes to the corresponding cycloalkanonoximes by reacting the cycloalkane with a nitrogen oxide (preferably nitric oxide) in the presence of a thermally activatable reaction promoter at an elevated temperature which, according to a theory of the present invention to be developed hereinafter, is capable of yielding free-radicals at such elevated temperature. It is a still more surprising fact that certain compounds which are considered thermally activatable and produce the free-radicals of the present invention may be similar in structure to reaction promoters activatable by ultraviolet light. For the most part, however, workers in the field have persisted in using low temperature activation by means of ultraviolet radiation, presumably as a result of the conviction that other forms of activation would limit the rate of formation of the desired product. We have now found, unexpectedly, that this is not the case and that cycloalkanonoximes can be formed in high yield at elevated temperatures through the use of thermally activatable reaction promoters, of which the molecular halogens and nitrogen oxyhalides have been found to be by far the best. These substances can be activated in the gas phase at temperatures between 150° and 650° C., according to this invention, to effect a reaction between the nitric oxide and the cycloalkane; the nitrogen oxyhalide giving best results is nitrosyl halide, the preferred halogen being chlorine. It has, however, been determined that a reaction time between substantially 0.1 and 10 sec. can be used to advantage.

The gaseous reaction mixture of the present invention thus consists essentially of the cycloalkane, nitric oxide and a halogen and/or nitrosyl halide under such reaction conditions that the energy required by the reaction system is supplied in the form of thermal energy rather than radiant energy of the ultraviolet type, as has been proposed heretofore. The main advantage of the present process, therefore, lies in the substitution for the radiant energy of known processes, of thermal energy which is more readily available, requires less complex equipment and presents no difficulties in manipulation. It has been found that the present process can be applied to all cycloaliphatic hydrocarbons having a ring with a carbon number higher than 4 and to substitution products of such hydrocarbons. Best results are obtained, however, with cycloalkanes having from 5 to 12 carbon atoms in the ring and alkyl-substituted rings in this class. Examples of such cycloaliphatic hydrocarbons are cyclopentane, cyclohexane, cycloheptane, cyclo-octane, cyclododecane and methyl cyclohexane.

The source of nitric oxide of the present invention may be the nitrous gases obtained by reaction of ammonia with air. Such gas mixture, which contains nitric oxide, nitrogen and water vapor, can be mixed with the gaseous halogen and/or nitrosyl chloride and then reacted with the cycloalkane in the gas phase. The reactor may be empty or can contain an inert filler (e.g. glass, ceramic, pumice etc.) in a fixed or fluidized bed.

The mixture of nitric oxide and halogens and/or nitrosyl chloride, adapted to be reacted with the cycloalkane, can be obtained, according to another feature of the present invention by reacting a mixture of nitrogen oxides (containing NO, $NO_2$ and $N_2O_3$) with a halogen acid or by reacting a gaseous mixture of NO and $NO_2$ with metal halides and particularly with chlorides. As is evident, there exists a wide variety of possibilities for the application of the present invention as described above. It may be noted, however, that most effective results are obtained when the reaction temperature is between 200° and 450° C. and the reaction time is between 0.1 and 5 seconds; the reaction promoter (i.e. molecular halogen or nitrosyl halide), nitric oxide and cycloalkane should, according to this invention, be in a molar ratio between substantially 1:2:2 and 1:40:20.

According to still another feature of this invention, hydrogen-containing inorganic compounds in a gaseous state at the reaction temperature can serve as an adjuvant to the reaction mixture. Such substances (e.g. hydrogen halides, such as hydrogen chloride and hydrogen bromide) and water vapor have been found to act favorably on the course of the reaction.

The following theory, which is not intended to limit the scope of the present invention, is presented to interpret the reaction mechanism in the formation of cyclohexanonoxime by making reference to the following reactions:

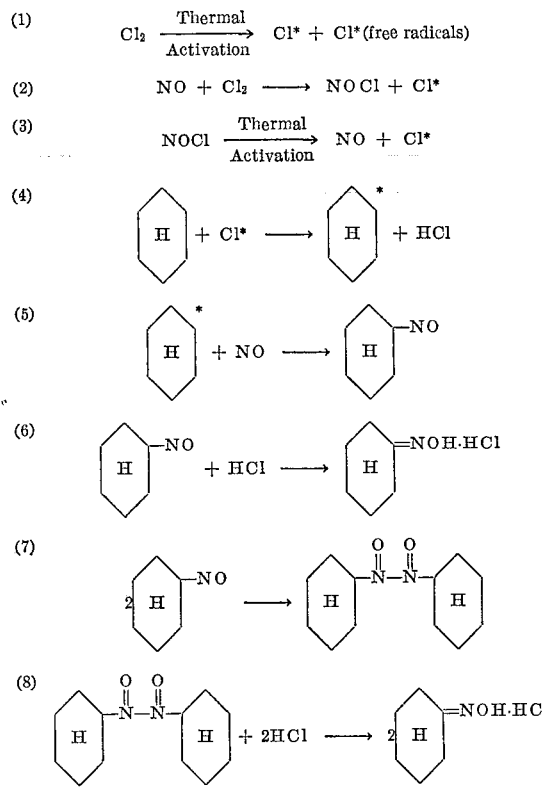

Equations 1, 2 and 3 represent the thermal activation or chemical activation of the halogen, i.e. chlorine, while Equations 4 to 8 account for the formation of the cyclohexanonoxime. Equations 1 and 2 refer to the initiation reactions involving nitrogen oxide and chlorine, while Equation 3 refers to the initiation reaction of nitrosylchloride.

As can be perceived from the above reaction schemes, the presence of hydrogen chloride is particularly suited for promoting the isomerization of nitroso-cyclohexane, both monomeric and dimeric (cf. Equations 6 and 8).

The invention is described in greater detail hereinafter with reference to the following specific examples and to the accompanying drawing, the sole figure of which is a flow diagram representing an apparatus for carrying out the process of the present invention.

EXAMPLE I

Into a reaction apparatus, consisting of a tubular Pyrex-glass reactor with an inside diameter of 25 mm. and a height of 300 mm. and containing 100 cc. of glass grit with a grain size between 48 and 100 mesh capable of functioning as an inert fluidized bed, and heated by external resistance heaters, a gaseous reaction mixture was fed; the reaction mixture was perfectly homogeneous and consisted of chlorine, nitric oxide, cyclohexane vapor and water vapor. The reaction mixture was supplied at an hourly flow rate respectively of 5 l. (0.208 mole/hr.), 50 l. (2.08 moles per hour), 260 gr. (3.09 moles/hr.) and 13 gr. (0.722 mole per hour). The temperature was maintained at about 300° C. throughout the reaction and stagnation (i.e. halting of the gas flow) was carefully avoided.

The gases coming out of the reaction were rapidly cooled by refrigeration in order to condense most of the condensable gases, while the uncondensed gases were then subjected to washing with water in order to eliminate traces of hydrogen chloride and cyclohexane.

After a reaction time of 2 hours, the liquid obtained by refrigerating the gases coming from the reactor was added to the liquid obtained from the washing of the remaining gases; then the organic layer was separated and treated separately while the aqueous layer was neutralized to a pH of about 6 by adding solid sodium bicarbonate.

A semi-solid brown product thus separated and was removed together with all the other liquors resulting from extraction with 4 consecutive portions of 30–40 cc. of methylene chloride. Following the evaporation of the methylene chloride, 17 gr. of a solid crystalline residue was recovered which, after crystallization from light gasoline, gave 15 gr. of cyclohexanonoxime.

Infrared (I.R.) spectrographic analysis of a sample of that product confirmed that it was cyclohexanonoxime. A sample of the product, recrystallized and admixed with a sample of cyclohexanonoxime prepared by another method, did not show any lowering of the melting point.

Another sample was subjected to the Beckmann reaction whereupon caprolactam was obtained having a solidifying point of 69°–69.2° C..

The organic layer, separated from the acidic aqueous phase described above, was concentrated to dryness by evaporation under vacuum of the cyclohexane (472 g. recovered) and of the other volatile products present in it. 17 g. of a crystalline product remained as a residue which turned out to be bis-(nitroso-cyclohexane) as confirmed by I.R. analysis as well as by the melting-point test in admixture with bis-(nitroso cyclohexane) obtained in another way.

This product was then transformed into cyclohexanonoxime by known methods, e.g. by saturating a solution thereof in cyclohexane with gaseous hydrogen chloride, under the action of untraviolet radiation.

The reaction liquids were also found to contain chlorocyclohexane and a minor quantity of other products whose identity was established through infrared analysis and turned out to be nitro-cyclohexane and aliphatic derivatives containing nitrylic groups and traces of caprolactam.

EXAMPLE II

Operating according to the same procedures and with the same equipment as described in Example I, the vessel containing 50 cc. of glass grit of a size comprised between 48 and 100 mesh, and maintained at 350° C., nitrosyl chloride, cyclohexane vapor, water vapor and hydrogen chloride were introduced at an hourly rate of 11.1 l. (0.458 mole/hr.), 290 g. (3.45 moles/hr.), 13 g. (0.722 mole/hr.) and 10 l. (0.416 mole/hr.), respectively. After two hours of reaction, the liquid obtained by cooling the gases coming from the reactor and the liquid obtained by washing the residual gases with water, were mixed together and the organic layer separated from the aqueous one.

By fractionating the organic layer 530 g. of cyclohexane, chlorocyclohexane and minor quantities of nitrocyclohexane were obtained.

From the aqueous layer, after neutralization and extraction with solvents, 6 g. (0.053 mole) of cyclohexanonoxime was obtained.

EXAMPLE III

Into a coil reactor of 35 cc., heated externally by a heating bath at a constant temperature of 300° C., was fed a gaseous mixture consisting of cyclohexane, nitrogen oxide, chlorine and hydrogen chloride, at an hourly rate of 105 g. (1.25 moles/hr.), 60 l. (2.5 moles/hr.), 8.9 g. (0.125 mole/hr.) and 12 l. (0.50 mole/hr.), respectively. The molar ratio thus was $C_6H_{12}:NO:Cl_2:HCl=10:20:1:4$.

The gases coming out of the reactor were cooled by water at 10° C., thereby condensing cyclohexanonoxime hydrochloride and part of the cyclohexane. The residual cyclohexane was then condensed by further refrigeration in three successive cooling traps at −80° C.

After 3 hrs. of reaction a crystalline and a cyclohexanic phase were obtained; the latter phase resulted from the first cooling with water and from the further cooling in the three traps. The crystalline phase, which turned out to be almost exclusively formed of cyclohexanonoxime hydrochloride, was dissolved in acetic acid and titrated potentiometrically.

In this way 19.2 g. (0.170 mole) of cyclohexanonoxime were detected. Furthermore, from the cyclohexanic phase were recovered 288.5 g. (3.435 moles) of cyclohexane and 2.3 g. (0.010 mole) of bis-(nitroso-cyclohexane); by chromatographic analysis 9.3 g. (0.079 mole) of chloro-cyclohexane, 3.6 g. (0.025 mole) of cyclohexyl nitrate and 0.6 g. (0.005 mole) of nitro-cyclohexane were detected.

The conversion of the cyclohexane turned out to be 8.4% by weight with a net yield by weight in cyclohexanonoxime and bis(nitroso-cyclohexane) of 60.4%, of 25.1% chlorocyclohexane, of 8% cyclohexyl nitrate and 1.7% nitro-cyclohexane.

EXAMPLE IV

The equipment used consisted of four identical empty reactors (see the sole figure of the drawing) connected to each other in series, each one having a capacity of 50 cc. Their external temperature was maintained at about 250° C. by means of heating jackets, while the inside temperature varied from a minimum of 240° C. to a maximum of 280° C.

Through pipe 18 was conveyed a gaseous current of cyclohexane at a flow rate of 210 g./hr. (2.5 moles/hr.) and HCl at a flow rate of 24 l./hr. (1 mole/hr.); through pipe 19 was conveyed nitrogen oxide at a flow rate of 120 l./hr. (5.0 moles/hr.), while chlorine was fed through pipes 14, 15, 16 and 17 at a total flow rate measured at pipe 13 of 17.8 g./hr. (0.250 mole/hr.).

The reaction products coming out of reactors 1, 2, 3 and 4 were cooled to 45°–55° C. respectively in refrigerators 5, 6, 7 and 8 by means of an external refrigerating bath, so as to condense all the cycloalkanonoxime hydrochloride, while maintaining all the cyclohexane in the gaseous phase. The gases coming out of each reactor were then united in mixers 10, 11 and 12 with the fresh inflowing chlorine. At the outlet of reactor 4 the reaction gases were cooled with water to 10° C. in order to condense most of the cyclohexane. The cyclohexane was then condensed by further cooling in three successive traps to −80° C. The uncondensible gases were next washed with an aqueous solution of NaOH in order to absorb the HCl produced, and the nitrogen oxide in excess was re-cycled.

After 2 hrs. of operation in this manner a crystalline and a cyclohexanic phase coming from the first water-cooling stage and from the three traps, was obtained. The crystalline phase consisted mainly of cyclohexanonoxime hydrochloride; after having been dissolved in acetic acid, it was titrated potentiometrically thereby showing the presence of 22.6 g. (0.201 mol) of cyclohexanonoxime.

From the cyclohexanic phase were recovered 394 g. (4.69 moles) of cyclohexane and 2.3 g. (0.010 mol) of bis(nitrosocyclohexane); through chromatographic analysis were found, furthermore, 3.9 g. (0.033 mole) of chloro-cyclohexane, 3.8 g. (0.025 mole) of 1,1-dichloro-cyclohexane and traces of cyclohexyl nitrate (0.007 mole) and nitro-cyclohexane (0.005 mole). The conversion of the cyclohexane amounted, therefore, to 6.2% by weight with a net yield by weight cyclohexanonoxime+bis(nitrosocyclohexane) of 71.0% in chloro-cyclohexane of 10.6%, in 1.1-dichlorocyclohexane of 8.1%, in cyclohexyl nitrate of 2.4%, and in nitro-cyclohexane of 1.6%.

EXAMPLE V

Into an inverted U-shaped reactor with an overall length of 100 cm. and inside diameter of 17 mm., containing lead-glass grit of 0.1 mm. granular diameter, acting as diluted fluidized bed and heated by external heating elements, a gaseous mixture consisting of cyclohexane, nitrogen oxide, chlorine and hydrogen chloride was fed at an hourly flow rate of 210 g. (2.50 moles/hr.). 120 l. (5.0 moles/hr.), 17.8 g. (0.250 mole/hr.), and 24 l. (1.0 mole/hr.), respectively, while a small feeding screw supplied 100 cc. per hour of glass beads to the reactor.

Throughout the process the temperature of the ascending arm of the inverted U-reactor was 250° C. and that of the descending arm was 280° C. The gases coming out of the reactor were cooled by quenching with cyclohexane coming from the condensation of the reaction gases and subsequently by refrigeration in three cooling traps at −80° C.

After a two-hour reaction time, a cyclohexanic and a semi-solid phase were obtained, the latter consisting almost entirely of cyclohexanonoxime hydrochloride. This phase, dissolved in acetic acid, was titrated potentiometrically, revealing the presence of 23.6 g. (0.209 mole) of cyclohexanonoxime.

From the cyclohexanic phase 3.91 g. (4.66 moles) of cyclohexane and 2.3 (0.010 mole) of bis-(nitroso-cyclohexane) were recovered and the chromatographic analysis furthermore revealed 8.4 g. (0.271 mole) of chlorocyclohexane, 3.8 g. (0.026 mole) of cyclohexyl nitrate and 0.7 g. (0.005 mole) of nitro-cyclohexane.

Thus the cyclohexane conversion amounted to 6.8% by weight, with a net yield by weight in cyclohexanonoxime+bis(nitroso-cyclohexane) of 57.4%, in chlorocyclohexane of 21.0%, in cyclohexyl nitrate of 7.6%, and in nitro-cyclohexane of 1.5%.

What is claimed is:

1. A process for the production of cycloalkanonoximes having rings with 5 to 12 carbon atoms, consisting of reacting in gaseous phase a cycloalkane having a ring containing from 5 to 12 carbon atoms and a nitrogen oxide at a temperature between substantially 150° and 650° C. in the presence of a thermally activatable reaction promoter selected from the group consisting of chlorine, bromine, nitrosyl chloride and nitrosyl bromide for a period ranging between substantially 0.1 and 10 seconds and with said reaction promoter present in sufficient proportion to effect oximation of said cycloalkane by said nitrogen oxide.

2. A process for the production of cycloalkanonoximes having rings with 5 to 12 carbon atoms, consisting of reacting in gaseous phase a cycloalkane having a ring containing from 5 to 12 carbon atoms and a nitrogen oxide at a temperature between substantially 150° and 650° C. in the presence of a thermally activatable reaction promoter selected from the group consisting of chlorine, bromine, nitrosyl chloride and nitrosyl bromide for a period ranging between substantially 0.1 and 10 seconds to effect oximation of said cycloalkane by said nitrogen oxide, said reaction promoter, nitrogen oxide and cycloalkane being present in a molar ratio ranging between substantially 1:2:2 and 1:40:20.

3. A process as defined in claim 2 wherein said cycloalkane is selected from the group consisting of cyclopentane, cyclohexane, cycloheptane, cyclo-octane, cyclododecane and alkyl-substituted derivatives thereof.

4. A process as defined in claim 3 wherein said temperature is between substantially 200° and 450° C.

5. A process as defined in claim 4 wherein said period ranges between substantially 0.1 and 5 seconds.

6. A process as defined in claim 3 wherein said gaseous phase includes at least one additional component selected from the group consisting of hydrogen halides and water vapor.

7. A process as defined in claim 3 wherein said reaction is carried out with a gaseous mixture of said cycloalkane, molecular chlorine, and nitric oxide.

8. A process as defined in claim 7 wherein said mixture further includes nitrosyl chloride.

References Cited

UNITED STATES PATENTS

| 3,047,482 | 7/1962 | Cheng et al. | 260—566 |
| 3,048,634 | 8/1962 | Mueller et al. | 260—566 |

CHARLES B. PARKER, *Primary Examiner.*

R. V. HINES, *Assistant Examiner.*